United States Patent [19]
Nelson

[11] 4,054,149
[45] Oct. 18, 1977

[54] APPARATUS FOR CLEANING AND STORING A RECREATIONAL VEHICLE SEWER HOSE ASSEMBLY

[76] Inventor: Wray H. Nelson, 307 N. 15th St., Colorado Springs, Colo. 80904

[21] Appl. No.: 677,536

[22] Filed: Apr. 16, 1976

[51] Int. Cl.² .................. B08B 3/02; B08B 9/02
[52] U.S. Cl. .................. 134/167 C; 134/149; 15/304; 15/406; 248/75
[58] Field of Search .............. 134/22 C, 149, 152, 134/166 C, 167 C, 168 C, 169 C; 211/60 R; 248/75; 15/304, 313, 315, 406; 138/106, 108

[56] References Cited
U.S. PATENT DOCUMENTS

| | | | |
|---|---|---|---|
| 2,806,237 | 9/1957 | Love | 15/304 X |
| 3,062,227 | 11/1962 | Soderberg | 134/168 C |
| 3,642,013 | 2/1972 | Thierstein | 134/152 X |
| 3,819,137 | 6/1974 | Smith | 138/106 X |
| 3,899,149 | 8/1975 | Schneider | 248/75 |

*Primary Examiner*—Robert L. Bleutge
*Attorney, Agent, or Firm*—Marcus L. Bates

[57] ABSTRACT

Apparatus for storing a recreational vehicle sewer hose assembly comprising spaced cone members affixed to a central apertured mandrel with one cone element being slidably received respective to the mandrel and to the remaining fixed cone element. The mandrel is apertured and has an inlet end which can be connected to a water supply so that the slidable cone can be removed from the mandrel, a sewer hose assembly telescopingly received in a collapsed manner about the mandrel, and the slidable cone member replaced upon the mandrel with the collapsed sewer hose being captured so that it is in stored relationship therebetween. During the above manipulation, water flows into the mandrel and through the apertures to wash any accumulation of sewage from the interior of the hose assembly. This expedient enables the entire apparatus to be subsequently drained so that the entire combination can be conveniently handled and stored in a sanitary and compact manner.

10 Claims, 7 Drawing Figures

U.S. Patent  Oct. 18, 1977  Sheet 1 of 2  4,054,149
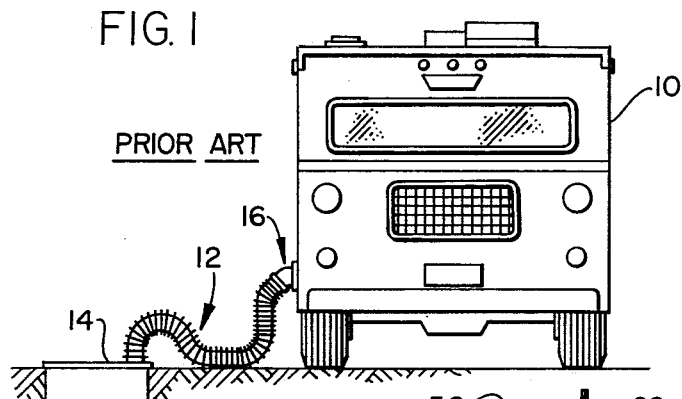
FIG. 1 PRIOR ART
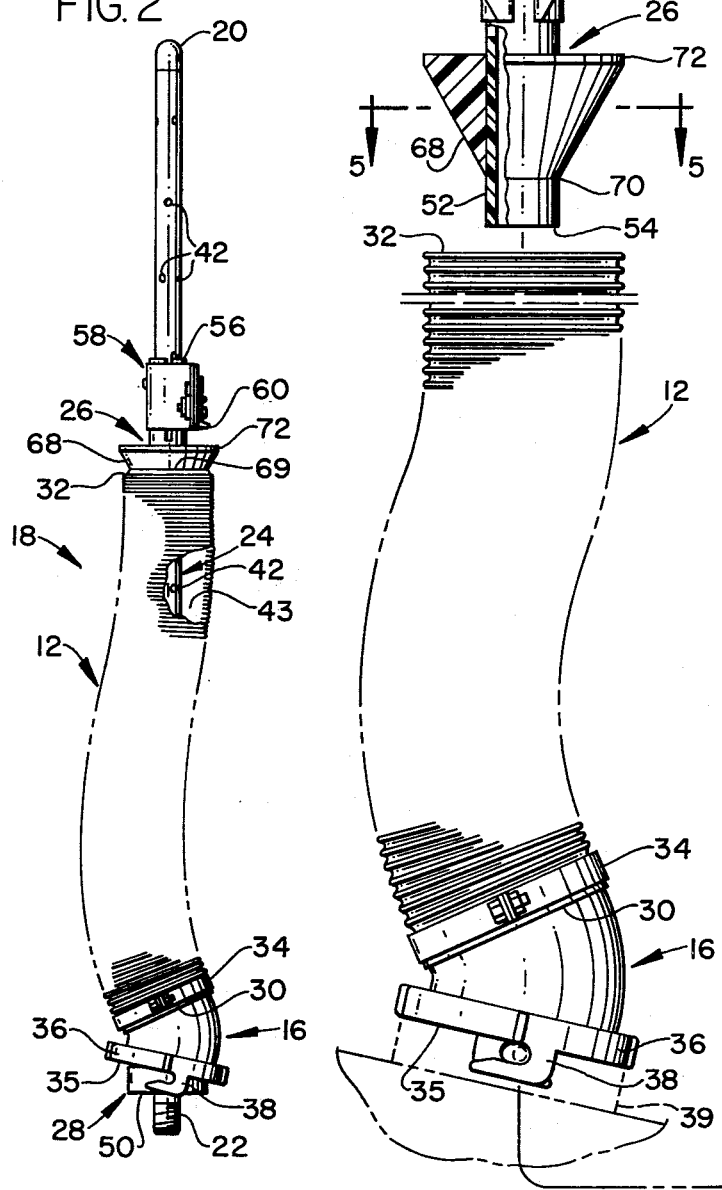
FIG. 2
FIG. 3
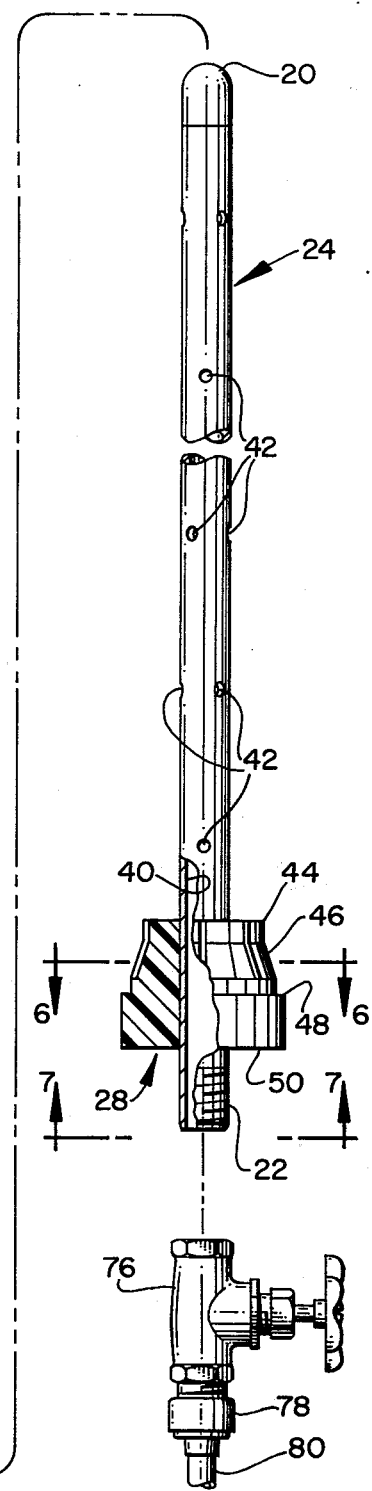

APPARATUS FOR CLEANING AND STORING A RECREATIONAL VEHICLE SEWER HOSE ASSEMBLY

BACKGROUND OF THE INVENTION

Most modern recreational vehicles are equipped with toilets which flow into a sewage holding tank. A sewage outlet connection is provided at the holding tank so that a flow coupling can be affixed to a fitting therefor and a flexible accordion or fluted collapsible hose led therefrom and into a common sewer inlet.

Each time the recreational vehicle is relocated, it is necessary to disconnect the sewer hose assembly, store the assembly until subsequently needed, and thereupon reconnect the sewer hose assembly between the holding tank fitting and the sewer facilities. This is an undesirable and unsanitary task which is looked upon with great disfavor by the vast majority of camper enthusiasts. Heretofore, only partial solutions to this detestable task have been noted; as for example, it is possible to use a common garden hose so that the interior of the sewer hose can be washed after it has been removed from the camper connection and before it is manually collapsed, drained, and stored. Storage of the contaminated hose is always a problem and brings about a further unsanitary condition, because it contaminates everything adjacent thereto. Another partial solution to this unsanitary task is to have made available a hollow tubular storage container located externally of the recreational vehicle so that the hose can be forced into the storage container for transportation along with the vehicle to the next camper site.

It would therefore be desirable to have made available a new combination of elements whereby a sewer hose assembly can be disconnected from the recreational vehicle, the interior thereof washed with a spray-like action, the hose assembly conveniently manipulated into a small package, and thereafter stored in a small, unobtrusive, and convenient area somewhere within the recreational vehicle.

| THE PRIOR ART | |
|---|---|
| Brown et al | 1,733,147 |
| Schmidt | 2,489,108 |
| Thierstein | 3,642,013 |
| Little et al | 2,167,365 |
| Becker, Jr. | 3,363,854 |
| Bergholtz | 3,650,676 |
| Douglass | 2,515,702 |
| Kradisch | 637,344 |
| DiIllio | 3,604,038 |

The above art of record fails to disclose apparatus in combination with a sewer hose assembly for a recreational vehicle. Furthermore, the above cited art fails to disclose a mandrel having spaced cones thereon for receiving a sewer hose assembly in collapsed and captured relationship therebetween.

SUMMARY OF THE INVENTION

This invention encompasses apparatus for storing a recreational vehicle sewer hose assembly and comprises an elongated hollow mandrel having opposed marginal end portions; and a lower, enlarged cone assembly which is concentrically arranged in fixed relationship about a lower marginal end portion of the mandrel, while an upper, enlarged cone assembly is slidably and concentrically arranged about an upper marginal end portion of the mandrel. A lock means associated with the upper cone assembly increases the sliding friction effected between the mandrel and the upper cone assembly, so that the upper cone assembly can be selectively locked into fixed relationship respective to the mandrel, thereby selectively positioning the upper cone assembly along the upper marginal length of the mandrel. A flexible sewer hose assembly can be placed about the mandrel and centered in captured relationship between the two spaced cone assemblies so that the hose assembly is stored in a compact, collapsed, sanitary manner.

The invention further comprehends the provision of a fluid inlet formed at one end of the mandrel and perforations formed along a sidewall of the mandrel so that water can be connected to the mandrel interior to provide an outwardly directed spray which emerges into the annular area formed between the hose assembly and the mandrel. This expedient enables the interior of the sewer hose to be cleaned with a high velocity spray as it is telescopingly received about the mandrel and between the spaced cones.

Therefore, a primary object of the present invention is the provision of a new combination which includes a flexible, collapsible sewer hose assembly and a sewer hose handling apparatus.

Another object of the invention is to provide an improved device which facilitates the handling of a contaminated sewer hose assembly.

A further object of this invention is to disclose and provide a means by which a sewer hose assembly can be stored in a compact, improved manner.

A still further object of this invention is the provision of improvements in apparatus by which a sewer hose can be conveniently handled and stored in a compact and sanitary manner.

Another and still further object of the present invention is the provision of apparatus for cleaning and storing a collapsed sewer hose assembly in a sanitary and convenient manner.

An additional object of the invention is to provide a storage device by which an accordion-type flexible sewer hose can be stored in a collapsed and captured manner.

A further object of this invention is to disclose and provide a device for manipulating, washing, and storing a collapsible sewer hose to thereby facilitate its removal from one sewer system and its replacement in another sewer system.

BRIEF DESCRIPTION OF THE DRAWINGS

FIG. 1 is an elevational view of a recreational vehicle which discloses part of the combination of the present invention;

FIG. 2 is an enlarged, side elevational view of the combination of the present invention, with some parts thereof being cut away therefrom and some of the remaining parts being shown in cross section;

FIG. 3 is an exploded view of the combination of the present invention, with some parts thereof being cut away therefrom, and some of the remaining parts being shown in cross section;

DETAILED DESCRIPTION OF THE PREFERRED EMBODIMENT

Figure 4:
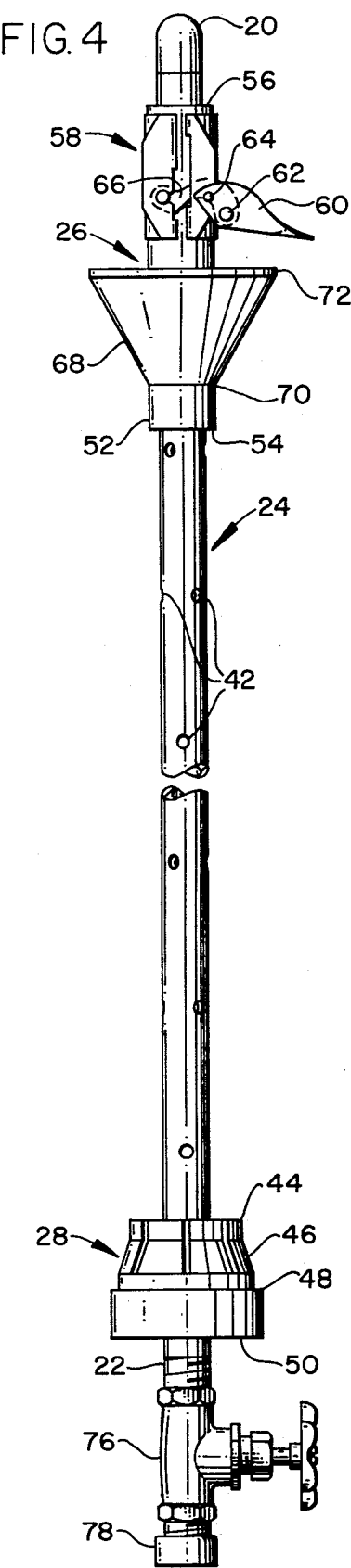
FIG. 4 is a side elevational view of the apparatus disclosed in FIG. 3, with the apparatus being disclosed in assembled configuration; and, FIGS. 5-7, respectively, are cross-sectional views taken along lines 5—5, 6—6, and 7—7, respectively, of FIG. 3.
Figure 5:
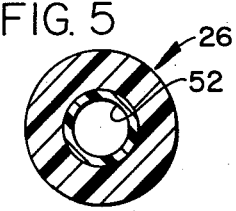
Figure 6:
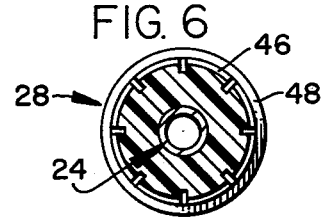
Figure 7:
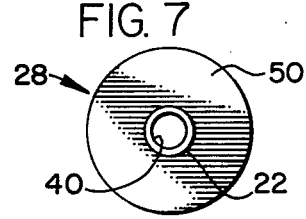

In FIG. 1 of the drawings, there is illustrated a recreational vehicle 10 and a sewer hose assembly 12. The sewer hose assembly has one end thereof flow connected to a sewer system at 14, with the remaining end 16 thereof being affixed to the recreational vehicle, so that sewage flowing from a toilet contained within the vehicle can flow into the hose at fitting 16, through the flexible, collapsible hose, and into the sewer.

FIG. 2 discloses the combination 18 of the present invention. As seen disclosed in FIG. 2, in conjunction with the remaining figures of the drawings, the combination includes a sewer holding apparatus having an upper closed end 20 and a lower threaded open end 22, which defines the upper and lower limits of an elongated mandrel 24.

An upper cone assembly 26 axially slidably receives the centrally located mandrel therethrough in a telescoping manner. A lower cone assembly 28 is fixed to a lower marginal end portion of the mandrel.

The before mentioned hose assembly is provided with a lower end 30, an upper end 32, and is affixed by means of clamp 34 to the before mentioned flow connector 16. The flow connector may be left attached to the vehicle or it may be left attached to the hose as illustrated in the drawings.

Flange 36 is provided with a flange face 35 from which there normally protrudes two opposed J-latches 38 by which the flow connector can be removably affixed to a connector 39 which is affixed to the recreational vehicle.

The interior wall of the mandrel is indicated by the numeral 40. The mandrel sidewall is apertured at 42, with the apertures being spaced along the central marginal length thereof. The before mentioned lower cone 40 assembly is provided with the illustrated minor outside diameter 44, which preferably is in the form of an annular, circumferentially extending shoulder which diverges in a downward direction to form a conical surface 46. The conical surface outwardly diverges at 48 to form a second larger annular shoulder. The lowermost end 50 of the lower cone assembly is placed above the illustrated threaded lower marginal end 22 of the mandrel. It is considered obvious to also mutually threadedly engage the marginal end of the mandrel and a nipple with the lower cone assembly, or to provide a threaded inlet which is made integral with the lower cone assembly.

An elongated, resilient, tubular element 52 is defined by spaced-apart lower and upper end portions 54 and 56, respectfully. Lock means 58 is connected to the tubular element and includes a handle 60 for manipulation thereof. Spaced pins 62 and 64 enable pivotal movement of the handle 60 to manipulate the latch means 66, thereby increasing or decreasing the effective diameter of the tubular element.

The upper cone assembly is provided with a circumferentially extending conical face 68 having a lowermost end 70 of a small diameter and an uppermost end 72 of a large diameter.

Valve 76 controls the flow of water through inlet connection 78, so that the valve and mandrel can be flow connected to a common garden hose 80 and the flow of water through the apertures 42 controlled by manipulation of the valve.

In operation, flow connection 16 of the sewer hose assembly is disconnected from the recreational vehicle at 39, the accordion-like or fluted hose 12 given a preliminary washing with a garden hose, whereupon the end 16 is then telescopingly placed about the mandrel. Valve 76 is open so that a spray of water emerges from the apertures 42, thereby cleaning the interior of the hose as it is collapsed about the mandrel. The upper cone assembly is then placed about the mandrel in a loose manner, and the entire apparatus set aside and permitted to drain, whereupon the apparatus can then be more compactly placed about the mandrel, the handle 60 moved so that latch 66 compresses the tubular element against the mandrel, as disclosed in FIG. 2.

I claim:

1. Apparatus for storing a recreational vehicle sewer hose assembly of a collapsible type comprising:
   an elongated mandrel having opposed marginal end portions, a lower enlarged cone assembly concentrically arranged in fixed relationship about a lower marginal end portion of said mandrel; an upper enlarged cone assembly slidably and concentrically arranged about an upper marginal end portion of said mandrel;
   said lower and upper cone assemblies having an external conical surface which reduces in diameter towards one another when both cone assemblies are positioned on said mandrel;
   lock means connected to said upper cone assembly by which said upper cone assembly can be selectively locked into fixed relationship respective to said mandrel and thereby selectively positioned along said upper marginal length of said mandrel;
   said upper and lower cone assemblies each having a major and a minor diameter of a value to receive the sewer hose of a recreational vehicle therebetween with a marginal length of each cone assembly being received within opposed marginal lengths of the sewer hose assembly such that the sewer hose assembly is held in captured relationship between the cone assemblies.

2. The apparatus of claim 1 wherein said mandrel is hollow, a closure means formed at one end of said mandrel, means forming spaced apertures within the wall of said mandrel, means forming an inlet at one end of said mandrel;
   so that a water supply can be connected to said inlet to cause water to flow into said mandrel, through said perforations, and outwardly from said mandrel whereupon a washing action responsive to the interior of the sewer hose assembly can be effected.

3. The apparatus of claim 3 wherein said upper cone assembly includes an elongated tubular element having an inside diameter which slidably receives said mandrel in a telescoping manner therethrough;
   said upper cone assembly being affixed in concentric relationship about a lower marginal length of said tubular element;
   said lock means being affixed to an upper marginal length of said tubular element in overlying relationship respective to said upper cone assembly, means by which said lock means can change the effective inside diameter of said upper marginal length of said tubular element, so that as the inside diameter of said tubular element is reduced, the interior wall thereof engages the outer wall of said mandrel to increase the friction therebetween and thereby lock the tubular element to the mandrel.

4. The improvement of claim 3 wherein said tubular element is resilient and deformable, said lock means being disposed to deform said tubular element into engagement with said mandrel.

5. The apparatus of claim 1 wherein said mandrel is hollow, a closure means at one end of said mandrel, means forming spaced apertures along said mandrel, means forming an inlet at one end of said mandrel;
- means by which a water supply can be connected to said inlet to cause water to flow into said mandrel, through said perforations, and outwardly from said mandrel whereupon a washing action is effected upon the interior of any sewer hose which may be disposed about the mandrel;
- said upper cone assembly includes an elongated tubular element having an inside diameter which slidably receives said mandrel in a telescoping manner therethrough; said upper cone assembly being affixed in concentric relationship about a lower marginal length of said tubular element;
- said lock means being affixed to an upper marginal length of said tubular element in overlying relationship respective to said upper cone element, means by which said lock means can change the effective inside diameter of said upper marginal length of said tubular element, so that as the inside diameter of said tubular element is reduced, the interior wall thereof engages the outer wall of said mandrel to thereby increase the friction therebetween and lock said tubular element to said mandrel.

6. In a sewer hose assembly having a flexible accordion-type hose affixed to a flow connector, the combination with said sewer hose assembly of a sewer hose storage apparatus;
- said sewer hose storage apparatus comprising an elongated mandrel; a fixed lower cone assembly; and a movable upper cone assembly;
- said lower cone assembly being affixed to one end of said mandrel; said upper cone assembly being slidably received in a removable manner by the remaining marginal end of said mandrel;
- lock means by which said upper cone assembly can be selectively positioned along said remaining marginal end of said mandrel and locked into fixed relationship thereto;
- said upper cone assembly havng a major diameter which is greater than the outside diameter of a marginal end of said sewer hose and a minor diameter smaller than the inside diameter of the last said marginal end of said sewer hose;
- said lower cone assembly having a major diameter greater than the inside diameter of said flow connector and a minor diameter smaller than the marginal end of said flow connector;
- said upper and lower cone assemblies being arranged respectively to one another and to said mandrel such that they mutually taper towards one another;
- whereby said upper cone assembly can be removed from said mandrel, said sewer hose assembly positioned with said lower cone in engagement with said flow connector, said hose collapsed about said mandrel, and said upper cone affixed to a marginal length of mandrel, with said sewer hose assembly being captured between said upper cone assembly and said lower cone assembly.

7. The apparatus of claim 6 wherein said mandrel is hollow, a closure means at one end of said mandrel, means forming spaced apertures along a sidewall of said mandrel, means forming an inlet at one end of said mandrel;
- so that a water supply can be connected to said inlet to said water to flow into the interior of said mandrel, through said apertures, and outwardly from said mandrel, whereupon a washing action is effected upon the annulus formed between the hose and mandrel.

8. The apparatus of claim 6 wherein said upper cone assembly includes an elongated tubular element having an inside diameter which slidably receives said mandrel in a telescoping manner therethrough;
- said upper cone assembly being affixed in concentric relationship about a lower marginal length of said tubular element;
- said lock means being affixed to an upper marginal length of said tubular element in overlying relationship respective to said upper cone element, means by which said lock means can change the effective inside diameter of said upper marginal length of said tubular element, so that as the inside diameter of said tubular element is reduced, the interior wall thereof engages the outer peripheral wall surface of said mandrel to increase the friction therebetween and thereby lock the tubular element to the mandrel.

9. The improvement of claim 8 wherein said tubular element is a resilient, deformable member, and said lock means deforms said tubular element into engagement with said mandrel.

10. The apparatus of claim 6 wherein said mandrel is hollow and includes a cylindrical sidewall; a closure means at one end of said mandrel, means forming spaced apertures within said sidewall of said mandrel, means forming an inlet at one end of said mandrel;
- so that a water supply can be connected to said inlet to cause water to flow into said mandrel, through said apertures, and outwardly from said mandrel, whereupon a washing action is effected upon the interior of the sewer hose;
- said upper cone assembly includes an elongated tubular element having an inside diameter which slidably receives said mandrel in a telescoping manner therethrough;
- said upper cone assembly being affixed in concentric relationship about a lower marginal length of said tubular element;
- said lock means being affixed to an upper marginal length of said tubular element in overlying relationship respective to said upper cone element, means by which said lock means can change the effective inside diameter of said upper marginal length of said tubular element, so that as the inside diameter of said tubular element is reduced, the interior wall thereof engages the outer wall surface of said mandrel to increase the friction therebetween and lock said tubular element to the mandrel.

* * * * *

UNITED STATES PATENT OFFICE
CERTIFICATE OF CORRECTION

PATENT NO. : 4,054,149
DATED : October 18, 1977
INVENTOR(S) : WRAY H. NELSON

It is certified that error appears in the above-identified patent and that said Letters Patent are hereby corrected as shown below:

Column 4, Claim 2, line 52, "responsive" should read --respective--;

Column 4, Claim 3, line 54, "The apparatus of claim 3" should read --The apparatus of claim 1--;

Column 5, Claim 6, line 48, "havng" should read --having--;

Signed and Sealed this

Seventh Day of March 1978

[SEAL]

Attest:

RUTH C. MASON
Attesting Officer

LUTRELLE F. PARKER
Acting Commissioner of Patents and Trademarks